Patented May 19, 1925.

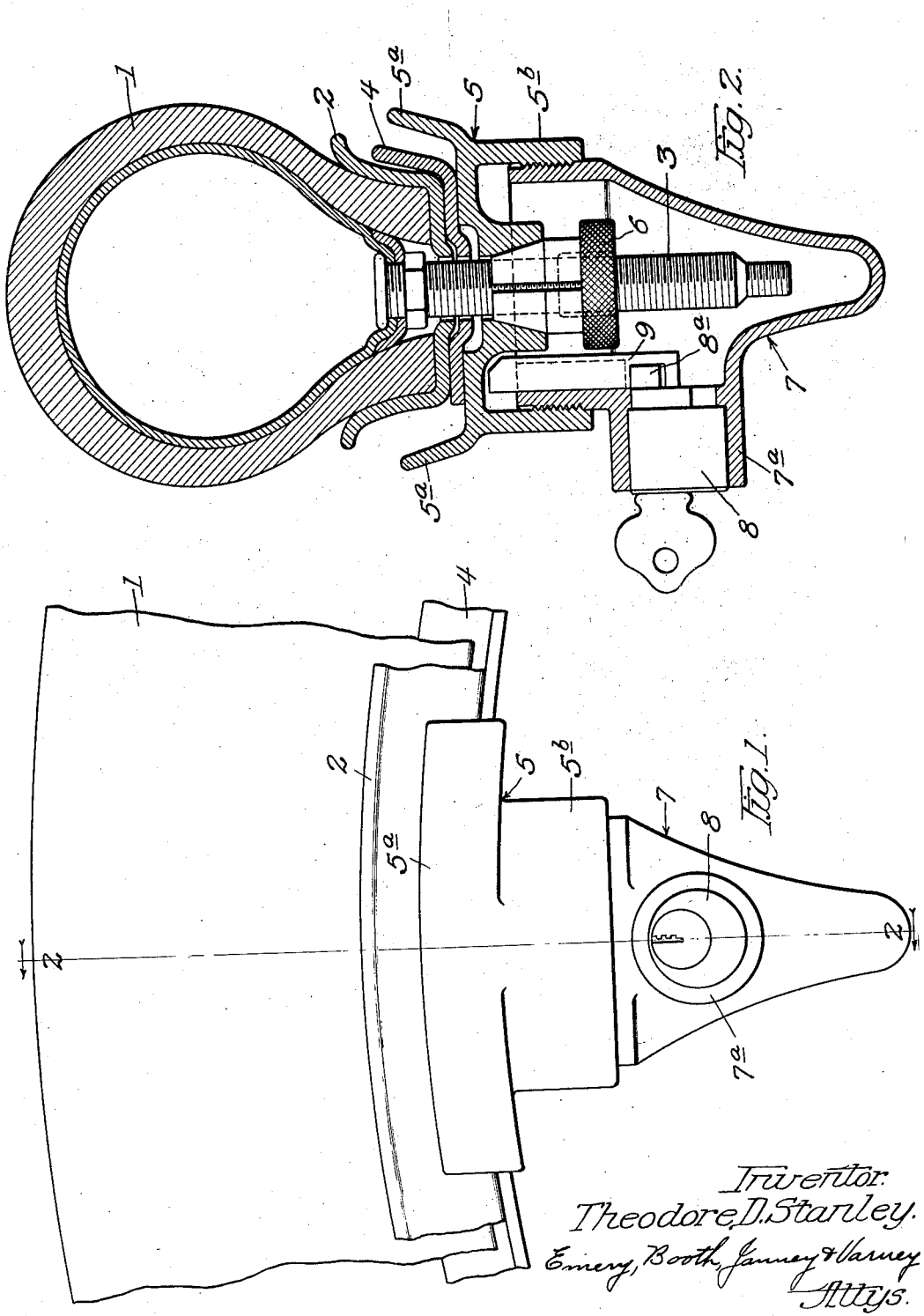

1,538,842

UNITED STATES PATENT OFFICE.

THEODORE D. STANLEY, OF DETROIT, MICHIGAN, ASSIGNOR TO LELAND LOCK COMPANY, OF DETROIT, MICHIGAN, A CORPORATION OF MICHIGAN.

TIRE LOCK.

Application filed December 18, 1920. Serial No. 431,683.

*To all whom it may concern:*

Be it known that I, THEODORE D. STANLEY, a citizen of the United States, and a resident of Detroit, Michigan, have invented an Improvement in Tire Locks, of which the following is a specification.

This invention relates to devices for preventing unauthorized removal and theft of tires from automobiles and other vehicles, or from display racks and the like.

Among other objects, the invention is intended to provide practical and reliable means for locking a pneumatic tire to or in place upon a tire holder.

One illustrative device, containing an embodiment of the invention, is shown for example in the accompanying drawings, in which—

Fig. 1 is a front elevation of the illustrative device, with a segment of a tire and tire holder.

Fig. 2 is a vertical cross-section of the same.

The drawings show an inflated automobile tire 1, fitted to a demountable wheel rim 2 which in this instance may be considered as a fixed element of the tire. The inner air tube of the tire is provided with the usual valve stem 3, protruding through an opening in the demountable wheel rim, and which may also be considered as a fixed element of the tire.

The assembled wheel rim and tire, representing in this case an extra or spare tire, is shown mounted on the carrier rim 4 of a spare tire carrier or rack such as is usually carried at the rear of an automobile. As indicated in the drawings, the tire is applied to the carrier rim with the valve stem passed through an opening in the carrier rim. Only a small segment of the tire and carrier rim is shown. Said carrier rim 4 typifies any holder either for supporting or carrying the tire, inclusive of a wheel or felly on which the tire is mounted.

While the illustrative holder 4 exemplifies a support for engaging the tire internally, and on which in this instance the tire is mounted analogously to its mounting on a wheel felly, it will be understood that devices embodying features of the present invention may be used for attaching and locking tires to other forms of tire holders, for instance to holders engaging the tire internally at one or more points, and to holders for engaging the tire externally.

The illustrative device for locking the tire to the illustrative tire holder comprises a metal fitting 5 clamped to the inner side of the tire holder by a valve-stem-engaging nut 6, and a metal cap 7 covering the valve stem and nut and locked to said fitting, in this instance by locking means housed in the cap. Thus the tire is clamped to or fastened firmly in place on the tire holder by valve-stem-fastening means, and the valve stem and fastening means are rendered inaccessible by a locked closure.

In the specific form illustrated, the fitting 5 has a central opening or passage for the valve stem, and is formed with tire-straddling flanges 5ª and with a depending annular flange 5ᵇ into which the cap 7 is screwed. The flanges 5ª prevent any substantial turning movement or rotation of either the fitting 5 or the tire on the axis of the valve stem, thus forestalling efforts by unauthorized persons to disengage the valve stem from the nut 6 while the cap or closure 7 is in place.

The nut 6 is shown of the split type and formed with a conical end portion engaging in a conical seat in the under side of the fitting 5 so as to wedge between the seat and valve stem and make a tight fastening which cannot work loose.

The locking means comprises a lock 8, preferably of the pin and cylinder type, shown set in a lateral housing 7ª formed on the cap 7 and controlling a vertically sliding lock bolt 9 which is guided on the interior of the cap and the upper end of which engages one of a circularly arranged number of notches in the under side of the fitting 5. As is well understood, the type of lock referred to comprises a rotatable cylinder controlled by pin detents, which cylinder may be freed from its detents and operated by inserting and turning only the proper key. The lock cylinder is shown formed with an eccentric pin 8ª engaging a cross slot of the lock bolt 9 for operating the latter. By a half turn of the key and lock cylinder from the position shown in Fig. 2, the lock bolt may be withdrawn from engagement with the fitting 5 to permit the cap 7 to be unscrewed from the fitting and removed.

With the illustrative construction it is impossible to obtain access to the valve stem and associated parts until the cap is unlocked and unscrewed from the valve stem, and as the lock cannot be picked there is substantially no danger of theft of the tire as is so easily possible where the tire is secured by an ordinary chain and pad lock. As before indicated neither the fitting 5 nor the tire can be rotated to unscrew the nut 6.

Furthermore, the inaccessibility of the tip of the valve stem renders it impossible to deflate the tire by opening the valve; consequently danger of theft of the outer tire case or shoe by deflation of the tire and forcible removal of the outer shoe from the wheel rim is substantially eliminated, since it is impossible to deflate the tire sufficiently for such removal except by substantially damaging the tire by cutting or punching. The closure of the valve stem by the cap is also an effective protection against dust.

The fitting 5 of the illustrative device exemplifies a member for cooperation with valve-stem engaging means to fasten the tire to a desired part of a vehicle, e. g. for fastening the tire to the illustrative holder carried by an automobile; said member 5 in this instance being clamped by the valve-stem nut to said holder. Devices embodying features of the present invention may however include the fitting 5 or functional parts thereof or equivalents as a part of the tire holder itself; said member 5 and its functional parts being thus exemplary of means on or associated with the holder.

The illustrative device further exemplifies various combinations and subcombinations embodying features of the present invention as hereinafter particularly set forth in the claims. For instance, the fitting 5 and cap 7 comprise cooperative parts or members one of which, in this instance the cap, is a lock-housing member. Said members may be considered as composing a separable locked valve-stem case or enclosure, with contained valve-stem engaging means, in this instance a separate valve-stem nut 6. Again, the illustrative device exemplifies a lock-housing member and cooperative member for effecting a locked fastening of the tire to a holder or part of a vehicle, one such member being affixed to the valve-stem before applying the other, and the other providing a cap or cover locked to and held in place by attachment to said first member.

While the tire shown in the drawings is fitted to a demountable wheel rim, considered in this instance as an element of the tire, it will be understood that devices embodying the invention may be used for locking pneumatic tires to wheel rims to which they are fitted, for instance to the non-demountable wheel rim of ordinary Ford cars.

An invention which embraces the specific structure herein shown and described is broadly claimed in an earlier application of the present inventor, while the claims of this application are directed to constructions and combinations specifically different from the specific structure disclosed in the aforesaid earlier application.

Obviously the present invention is not limited to any particular form of construction and the details of the illustrative construction may be variously modified. Moreover it is not indispensable that all the features of the invention be used conjointly as they may be used to advantage in various different combinations and sub-combinations.

I claim:

1. A device of the class described comprising, in combination, a lock-housing member and a cooperative member detachably-connectable therewith; said lock-housing member containing a lock and lock-controlled means for engagement with said other member to lock the two members together; means whereby one said member may be fastened to the valve-stem of a pneumatic tire before applying the other member in place, and said other member adapted to provide a cap or cover for the valve-stem and its fastening means.

2. A device of the class described comprising, in combination, a lock-housing member and a cooperative member detachably-connectable therewith; said lock-housing member containing a lock and lock-controlled means for engagement with said other member to lock the two members together; one of said members adapted to be applied in cooperative relationship with a pneumatic tire and tire-holder and to be fastened in place through the valve-stem of the tire before applying the other member in place; means associated with said last mentioned member for so fastening it and said other member adapted to provide a cap or cover for the valve-stem and fastening means.

3. A pneumatic tire-locking device comprising, in combination, valve-stem engaging means; means cooperable therewith for fastening the tire through the valve-stem to a tire holder; a cap enclosing the valve-stem and said valve-stem engaging means; and means for locking said cap.

4. A device of the class described comprising, in combination, a nut for engaging the valve-stem of a pneumatic vehicle tire; means for cooperation with the nut to fasten the tire through the valve-stem to a part of the vehicle; a cap for enclosing the valve-stem and nut, adapted for locked application; and means for locking the cap in place.

5. A device of the class described comprising, in combination, a nut for engaging the valve-stem of a pneumatic vehicle tire; a member adapted to be clamped by said nut to a part of the vehicle; a cap for the valve-stem and nut screwed to said member; and means for locking the cap in place.

6. A device of the class described comprising, in combination, a separable housing adapted to receive the valve-stem of a pneumatic tire; a nut, adapted to be enclosed by and separate from said housing, for engaging the valve-stem to fasten it in said housing; and means for locking said housing in non-separable condition.

7. A device for locking a pneumatic tire to a tire holder, comprising a holder-engaging member apertured for passage of the valve-stem of the tire; a valve-stem cap adapted for locked connection with said member; means for locking said cap to said member; and valve-stem engaging means within said cap for fastening the tire, holder and member through the valve stem; said member dependent upon said valve-stem engaging means for its attachment to said holder.

8. A device for locking a pneumatic tire to a tire holder, comprising a member applicable to the inner side of said holder having a portion to surround the valve-stem of the tire and a projecting portion or portions to coöperate with the tire; a valve-stem adapted for locked connection with said member; means for locking said cap to said member; and valve-stem engaging means within and separate from said cap whereby said member is held in place and the tire fastened to said holder.

9. A device for locking a pneumatic tire to a tire holder, comprising a member or fitting applicable to the holder and adapted to be fastened in place through the valve-stem of the tire; a valve-stem cap; and means for locking said cap to said member; there being valve-stem fastening means enclosed by the cap when in locked position.

10. A device for locking a pneumatic tire to a tire holder, comprising a member or fitting applicable to said holder opposite its tire-engaging side, and having an opening for passage of the valve-stem of the tire; and a valve-stem nut cooperating with said fitting to secure the same in place, and to fasten the tire to said holder; means cooperating with said member to provide a separable housing for the valve-stem and nut; and means for locking said housing.

11. In a tire locking device, a member or fitting applicable to a tire holder opposite its tire-engaging side, and having tire-straddling flanges or parts; a fastening means for detachably securing said member to said holder; a cap cooperating with said member for enclosing said fastening means; and a lock mounted in said cap for locking the same to said member.

12. The combination of a holder for a pneumatic tire, having an opening through which the valve-stem of the tire protrudes; a cap for enclosing the valve-stem; the holder being provided with means interfitting with the mouth of the cap, and with lock-bolt engaging means; means within the cap for engaging the valve-stem to fasten the tire to the holder thereby; and locking means mounted in the cap, including a lock-controlled bolt for cooperation with said lock-bolt engaging means, to lock the cap in place.

13. The combination of a holder for a pneumatic tire, having an opening through which the valve-stem of the tire protrudes; a cap for enclosing the valve-stem; the holder being provided with a threaded part for screw-engagement of the cap therewith; means for engagement with the valve-stem to fasten the tire to the holder thereby; and locking means for said cap.

14. The combination of a holder for a pneumatic tire; a cap for enclosing the valve-stem; there being opposite the tire-supporting side of the holder an abutment for a nut and a surrounding screw-threaded wall; a nut screwed on the valve-stem against said abutment; a cap for concealing said nut screwed to said wall; and means for locking said cap in place.

15. The combination of a holder for a pneumatic tire, having an opening through which the valve-stem of the tire protrudes; a cap for enclosing the valve-stem; the holder being provided with a part interfitting with the mouth of said cap; a separate nut within the cap for engaging the valve-stem to fasten the tire to the holder thereby; and means for locking said cap in place.

16. The combination of a holder for a pneumatic tire; means opposite the tire-supporting side of said holder affording a conical nut seat; a split conical nut screwed on the valve-stem against said seat; a cap or cover for said nut adapted for locked connection with the holder; and locking means for said cap.

In testimony whereof, I have signed my name to this specification.

THEODORE D. STANLEY.